United States Patent
Dorum

(10) Patent No.: US 10,378,908 B2
(45) Date of Patent: Aug. 13, 2019

(54) METHOD AND APPARATUS FOR DETERMINING ROAD STACKING BASED UPON ERROR STATISTICS

(71) Applicant: HERE Global B.V., Eindhoven (NL)

(72) Inventor: Ole Henry Dorum, Chicago, IL (US)

(73) Assignee: HERE Global B.V., Eindhoven (NL)

(*) Notice: Subject to any disclaimer, the term of this patent is extended or adjusted under 35 U.S.C. 154(b) by 0 days.

(21) Appl. No.: 14/752,185

(22) Filed: Jun. 26, 2015

(65) Prior Publication Data
US 2016/0377439 A1 Dec. 29, 2016

(51) Int. Cl.
*G01C 21/32* (2006.01)
*G01C 21/26* (2006.01)

(52) U.S. Cl.
CPC ............ *G01C 21/26* (2013.01); *G01C 21/32* (2013.01)

(58) Field of Classification Search
None
See application file for complete search history.

(56) References Cited

U.S. PATENT DOCUMENTS

| | | | |
|---|---|---|---|
| 8,359,156 B2 | 1/2013 | Guo et al. | |
| 8,612,136 B2 | 12/2013 | Levine et al. | |
| 2002/0050944 A1* | 5/2002 | Sheynblat | G01C 21/206 342/357.25 |
| 2009/0216442 A1 | 8/2009 | Luert | |
| 2012/0135745 A1* | 5/2012 | Kaplan | G01C 21/32 455/456.1 |
| 2013/0151135 A1* | 6/2013 | Aubrey | G08G 1/00 701/118 |
| 2013/0226448 A1* | 8/2013 | Bekaert | G01C 21/32 701/409 |
| 2013/0328863 A1* | 12/2013 | Pirwani | G06T 15/00 345/419 |
| 2015/0148059 A1* | 5/2015 | Puthenpura | H04W 64/00 455/456.1 |

(Continued)

FOREIGN PATENT DOCUMENTS

| | | |
|---|---|---|
| WO | WO-2011/160681 A1 | 12/2011 |
| WO | WO-2012/055427 A1 | 5/2012 |

OTHER PUBLICATIONS

Extended European Search Report for European Patent Application No. 16176286.9 dated Nov. 18, 2016, 7 pages.

(Continued)

*Primary Examiner* — Todd M Melton
*Assistant Examiner* — Jason R Roberson
(74) *Attorney, Agent, or Firm* — Alston & Bird LLP

(57) ABSTRACT

A method, apparatus and computer program product are provided to determine the stacking order of two or more roads that are vertically aligned with one another. In the context of a method, error statistics associated with probe points representative of travel along a first road are determined. In an instance in which the first road is vertically aligned with a second road, the method also includes determining whether one of the first or second roads passes beneath the other of the first or second roads based at least in part upon the error statistics associated with the probe points representative of travel along the first road. A corresponding apparatus and computer program product are also provided.

26 Claims, 8 Drawing Sheets

(56) References Cited

U.S. PATENT DOCUMENTS

2016/0359557 A1    12/2016    Szafraniec

OTHER PUBLICATIONS

A Decision-Rule Topological Map-Matching Algorithm with Multiple Spatial Data [online] [retrieved Aug. 1, 2016]. Retrieved from the Internet: <URL: http://cdn.intechopen.com/pdfs-wm/27716.pdf. pp. 215-241.
In re: Dorum; U.S. Appl. titled Method and Apparatus for Defining Road Geometry From Probe Data; U.S. Appl. No. 14/729,681, filed Jun. 3, 2015.

* cited by examiner

METHOD AND APPARATUS FOR DETERMINING ROAD STACKING BASED UPON ERROR STATISTICS

TECHNOLOGICAL FIELD

An example embodiment of the present invention relates generally to the creation or refinement of a map from a plurality of probe points and, more particularly, to the determination as to whether one road passes beneath another road based upon error statistics associated with the probe points.

BACKGROUND

Probe data may be collected by various data collection devices including global positioning systems (GPS) systems and other navigation systems. Regardless of the device that collects the probe data, the probe data may include a plurality of probe points. Each probe point may identify the location, such as in terms of latitude and longitude, at which the device that collected the probe data was located at the time at which the probe point was captured. A probe point may also include or otherwise be associated with a z-axis component indicative of the altitude or height of the device at the time at which the probe point was captured. However, information relating to the altitude associated with the probe point generally has a much greater tolerance and a much larger error associated therewith than the latitude and longitude associated with the probe point. For example, the altitude associated with a probe point may have an error of 10, 20, 30, 40, 50 or more meters. Additionally, not all probe points have an associated altitude with some probe points defining a location merely in terms of latitude and longitude.

During the creation of maps that identify road segments, the error associated with the altitude of the probe point has made it particularly difficult to determine if the probe points are associated with a road that passes over another road or a road that passes under another road. In this regard, roads sometimes cross one another or are otherwise stacked in such a manner that one road passes beneath another road. For example, an interchange of an interstate may include an underpass and an overpass with the road that forms the underpass passing beneath the road that forms the overpass. By way of another example, roads may be stacked with one road on top of another even in instances in which the roads do not cross. In these instances, the error associated with the altitude of the probe points may be sufficiently large that the probe points may not be reliably associated with either the upper or the lower road with a sufficient degree of confidence in the map creation or refinement process. In this regard, the error associated with the altitude of the probe points may be so large as to equal or exceed the anticipated vertical spacing between the roads such that the probe points may not be matched to the road that forms the overpass or the road that forms the underpass with the desired degree of confidence.

BRIEF SUMMARY

A method, apparatus and computer program product are provided in accordance with an example embodiment in order to determine the stacking order of two or more roads that are vertically aligned with one another. As such, the method, apparatus and computer program product of an example embodiment may determine which of the roads passes beneath the other of the roads, such as in an instance in which one of the roads is an underpass and the other of the roads is an overpass. By reliably determining the stacking order of two or more roads that are vertically aligned with one another, a method, apparatus and computer program product of an example embodiment may facilitate the creation or refinement of maps including those portions of a map in which two or more roads are vertically aligned with one another, such as in an instance in which two or more roads cross one another or are otherwise stacked.

In an example embodiment, a method is provided that includes determining error statistics associated with probe points representative of travel along a first road. In an instance in which the first road is vertically aligned with a second road, the method also includes determining whether one of the first or second roads passes beneath the other of the first or second roads based at least in part upon the error statistics associated with the probe points representative of travel along the first road.

The probe points of an example embodiment define the probe trace. As such, the method of this example embodiment determines whether one of the first or second roads passes beneath the other of the first or second roads by determining that the first road passes beneath the second road in an instance in which the error statistics associated with the probe points representative of travel along the first road increase proximate the second road. In regards to determining the error statistics, the method of this example embodiment may also include determining a root mean square error between probe traces. As such, the method of this example embodiment may determine that the first road passes beneath the second road in an instance in which a spread of root mean square errors between probe traces increases proximate the second road.

The method of an example embodiment also includes estimating a road centerline representation representative of the first road. In regards to determining the error statistics, the method of this example embodiment determines error statistics associated with a projection of the probe points on to the road centerline representation. The method of this example embodiment also determines whether one of the first or second roads passes beneath the other of the first or second roads by determining that the first road passes beneath the second road in an instance in which the error statistics associated with the probe points representative of travel along the first road increase proximate the second road. In an example embodiment, the method determines error statistics associated with a projection of probe points onto the road centerline representation by determining a root mean square error associated with projection distances of the probe points onto the road centerline representation. In an example embodiment, the method estimates the road centerline representation based upon the probe points representative of travel along the first road.

The method of an example embodiment determines error statistics by determining, for a respective probe point, a median heading direction of probe points proximate the respective probe point and defining a local orientation line from the respective probe point and extending in both directions of the median heading direction. The method of this example embodiment also determines error statistics by determining, for the respective probe point, a root mean square error associated with projection distances of the probe points onto the local orientation line. In regards to determining whether one of the first or second roads passes beneath the other of the first or second roads, the method of this example embodiment determines that the first road passes beneath the second road in an instance in which the root mean square error increases for a respective probe point proximate the second road.

The method of another example embodiment determines heading error statistics by determining, for a respective probe point, a median heading direction of probe points proximate the respective probe point and determining, for the respective probe point, a root mean square error associated with probe points proximate the respective probe point relative to the median heading direction. The method of this example embodiment also determines whether one of the first or second roads passes beneath the other of the first or second road by determining that the first road passes beneath the second road in an instance in which the root mean square error increases for the respective probe point proximate the second road.

In another example embodiment, an apparatus is provided that includes at least one processor and at least one memory including computer program code with the at least one memory and computer program code configured to, with the processor, cause the apparatus to at least determine error statistics associated with probe points representative of travel along the first road in an instance in which the first road crosses the second road. The at least one memory and the computer program code are configured to, with the processor, cause the apparatus to determine whether one of the first or second roads passes beneath the other of the first or second roads based at least in part upon the error statistics associated with the probe points representative of travel along the first road.

The probe points of an example embodiment define a probe trace. The at least one memory and the computer program code are configured to, with the processor, cause the apparatus of this example embodiment to determine whether one of the first or second roads passes beneath the other of the first or second roads by determining that the first road passes beneath the second road in an instance in which the error statistics associated with the probe points representative of travel along the first road increase proximate the second road. The at least one memory and the computer program code are configured to, with the processor, cause the apparatus of this example embodiment to determine error statistics by determining a root mean square error between probe traces. The at least one memory and the computer program code are also configured to, with the processor, cause the apparatus of this example embodiment to determine that the first road passes beneath the second road in an instance in which a spread of root mean square errors increases proximate the second road.

The at least one memory and the computer program code are further configured to, with the processor, cause the apparatus of an example embodiment to estimate a road centerline representation representative of the first road, such as based upon the probe points representative of travel along the first road. The at least one memory and the computer program code are configured to, with the processor, cause the apparatus of this example embodiment to determine the error statistics by determining error statistics associated with a projection of the probe points onto the road centerline representation. The at least one memory and the computer program code are also configured to, with the processor, cause the apparatus of this example embodiment to determine whether one of the first or second roads passes beneath the other of the first or second roads by determining that the first road passes beneath the second road in an instance in which the error statistics associated with the probe points representative of travel along the first road increase proximate the second road. In an example embodiment, the at least one memory and the computer program code are configured to, with the processor, cause the apparatus to determine error statistics associated with a projection of the probe points onto the road centerline representation by determining a root mean square error associated with the projection distances from the probe points onto the road centerline representation.

In regards to determining error statistics, the at least one memory and the computer program code are configured to, with the processor, cause the apparatus of an example embodiment to determine, for a respective probe point, a median heading direction of probe points proximate the respective probe point and to define a local orientation line from the respective probe point and extending in both directions of the median heading direction. The at least one memory and the computer program code are also configured to, with the processor, cause the apparatus of this example embodiment to determine error statistics by determining, for the respective probe point, the root mean square error associated with projection distances of the probe points onto the local orientation line. The at least one memory and the computer program code are also configured to, with the processor, cause the apparatus of this example embodiment to determine whether one of the first or second roads passes beneath the other of the first or second roads by determining that the first road passes beneath the second road in an instance in which the root mean square error increases for a respective probe point proximate the second road.

The at least one memory and the computer program code are configured to, with the processor, cause the apparatus of an example embodiment to determine heading error statistics by determining, for a respective probe point, a median heading direction of probe points proximate to the respective probe point and determining, for the respective probe point, a root mean square error associated with the probe points proximate the respective probe point relative to the median heading direction. The at least one memory and the computer program product are also configured to, with the processor, cause the apparatus of an example embodiment to determine whether one of the first or second roads passes beneath the other of the first or second roads by determining that the first road passes beneath the second road in an instance in which the root mean square error increases for a respective probe point proximate the second road.

In a further example embodiment, a computer program product is provided that includes at least one non-transitory computer-readable storage medium having computer-executable program code portions stored therein with the computer-executable program code portions including program code instructions configured to determine error statistics associated with probe points representative of travel along the first road. In an instance in which the first road crosses a second road, the computer-executable program code portions also include program code instructions configured to determine whether one of the first or second roads passes beneath the other of the first or second roads based at least in part upon the error statistics associated with the probe points representative of travel along the first road.

The probe points of an example embodiment define a probe trace. In this example embodiment, the program code instructions configured to determine whether one of the first or second roads passes beneath the other of the first or second roads include program code instructions configured to determine that the first road passes beneath the second road in an instance in which the error statistics associated with the probe points representative of travel along the first road increase proximate the second road.

The computer-executable program code portions of an example embodiment also include program code instructions configured to estimate a road centerline representation representative of the first road. In this example embodiment, the program code instructions configured to determine the error statistics include program code instructions configured to determine error statistics associated with a projection of the probe points onto the road centerline representation. The program code instructions of this example embodiment that are configured to determine whether one of the first or second roads passes beneath the other of the first or second roads include program code instructions configured to determine that the first road passes beneath the second road in an instance in which the error statistics associated with the probe points representative of travel along the first road increase proximate the second road.

The program code instructions of an example embodiment that are configured to determine error statistics include program code instructions configured to determine, for a respective probe point, a median heading direction of probe points proximate the respective probe point and program code instructions configured to define a local orientation line from the respective probe point and extending in both directions of the median heading direction. The program code instructions of this example embodiment that are configured to determine error statistics also include program code instructions configured to determine, for the respective probe point, a root mean square error associated with projection distances of the probe points onto the local orientation line. The program code instructions of this example embodiment that are configured to determine whether one of the first or second roads passes beneath the other of the first or second roads include program code instructions configured to determine that the first road passes beneath the second road in an instance in which the root mean square error increases for a respective probe point proximate the second road.

In yet another example embodiment, an apparatus is provided that includes means for determining error statistics associated with probe points representative of travel along the first road. In an instance in which the first road is vertically aligned with a second road, the apparatus of this example embodiment also includes means for determining whether one of the first or second roads passes beneath the other of the first or second roads based at least in part upon the error statistics associated with the probe points representative of travel along the first road.

BRIEF DESCRIPTION OF THE DRAWINGS

Figure 1:
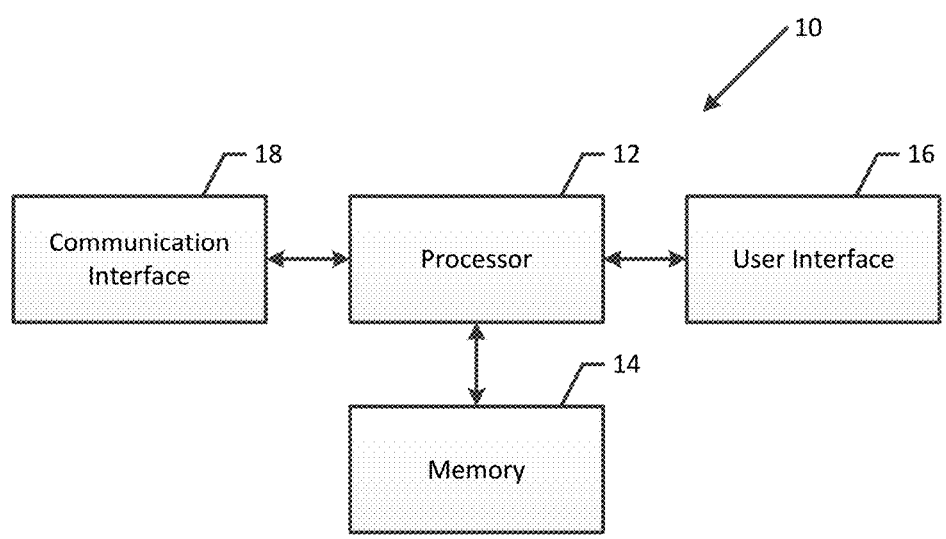
Figure 2:
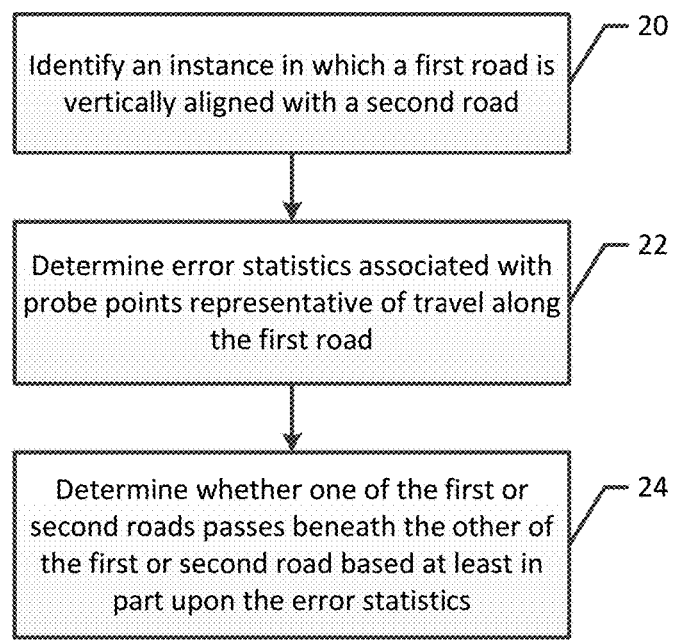
Figure 3:
Figure 4:
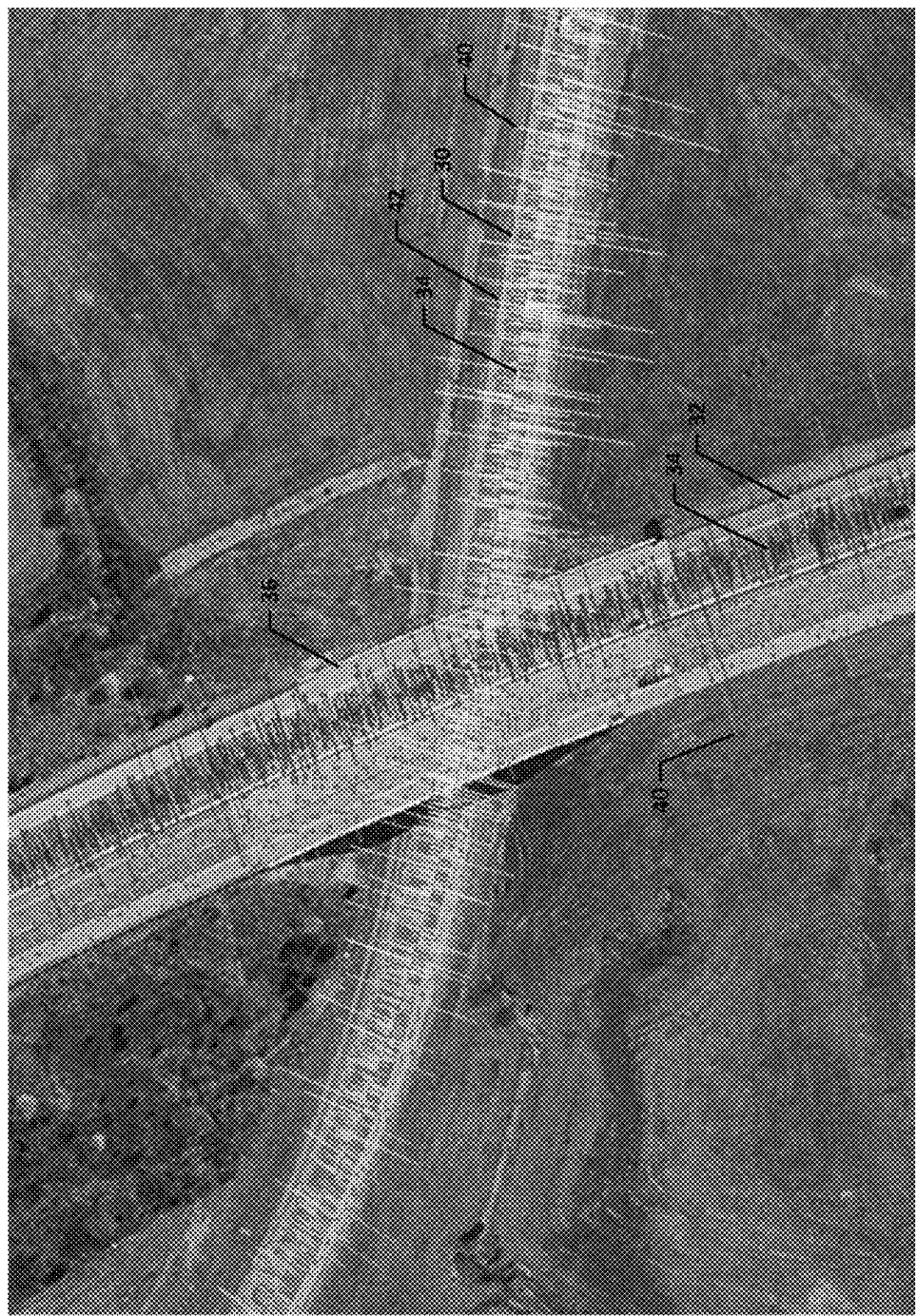
Figure 5:
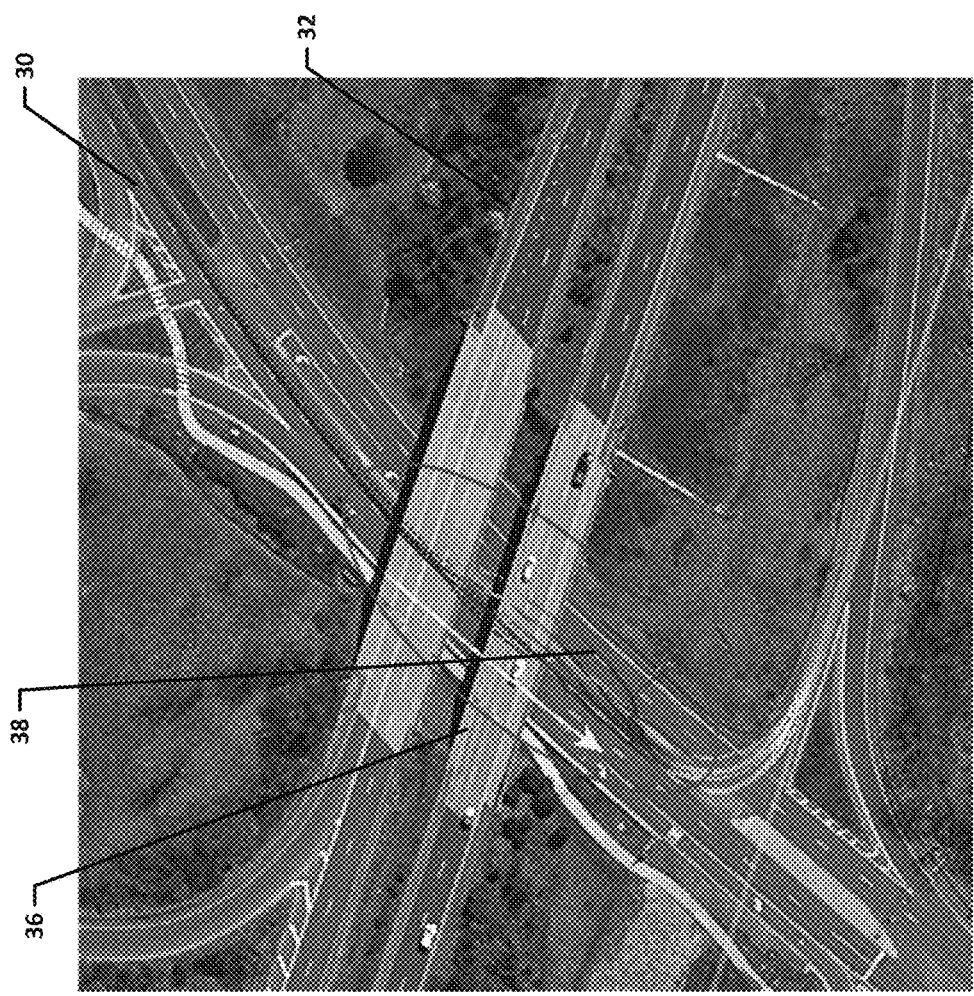
Figure 6:
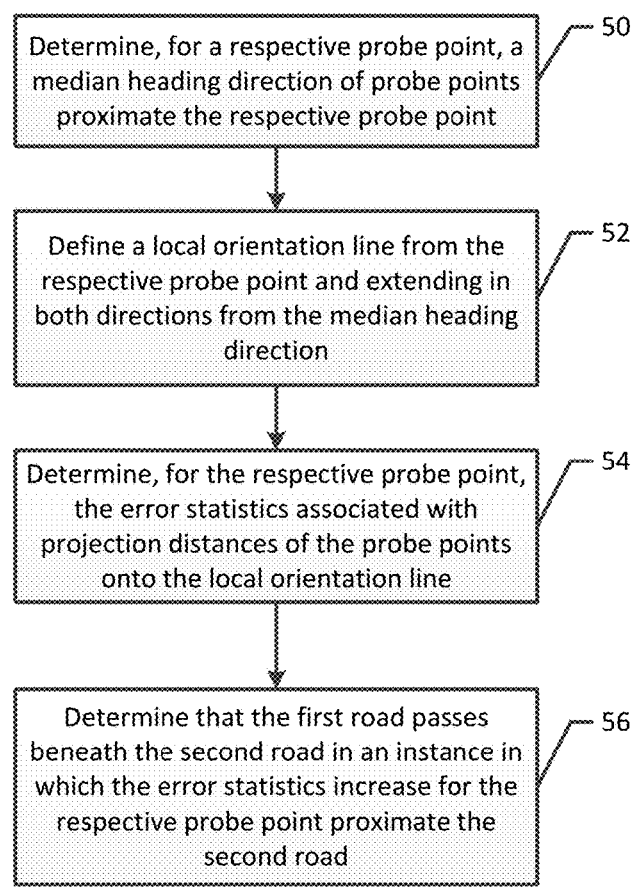
Figure 7:
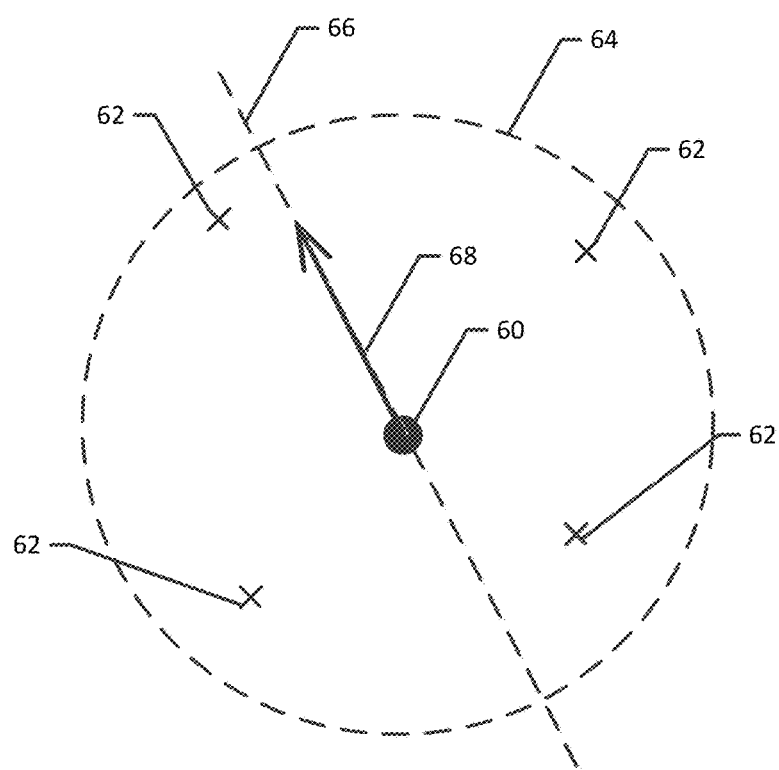
Figure 8:
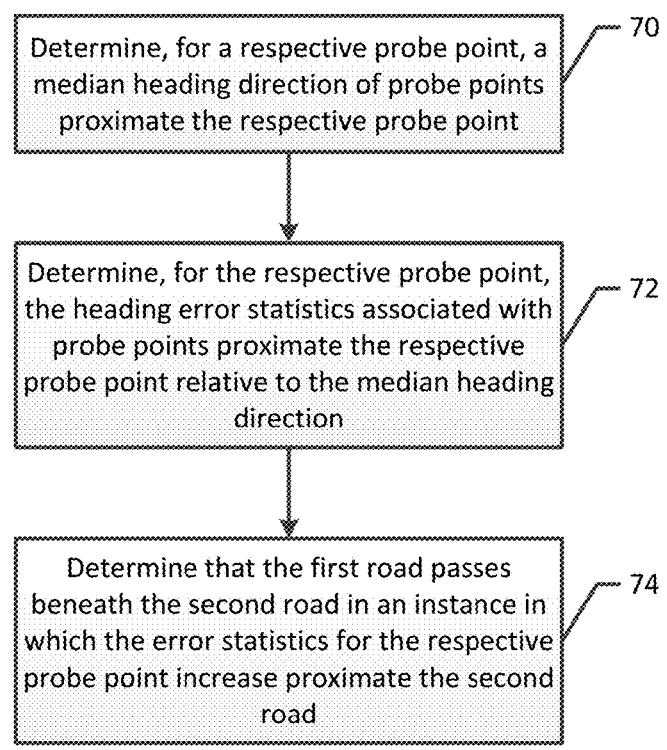

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present invention;

FIG. 2 is a flowchart illustrating the operations performed, such as by the apparatus of FIG. 1, in accordance with an example embodiment of the present invention;

FIG. 3 depicts first and second intersecting roads that are represented by respective polylines;

FIG. 4 illustrates the projection distances of probe points onto the respective polylines of the first and second roads depicted in FIG. 3;

FIG. 5 illustrates probe traces experiencing increased errors while captured in or immediately following an underpass;

FIG. 6 is a flowchart illustrating the operations performed, such as by the apparatus of FIG. 1, in order to determine error statistics in accordance with an example embodiment of the present invention;

FIG. 7 illustrates a probe point and the median heading direction of probe points proximate thereto for use in determining error statistics in accordance with an example embodiment of the present invention; and FIG. 8 is a flowchart illustrating the operations performed, such as by the apparatus of FIG. 1, in order to determine heading error statistics based upon differences in heading direction in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to determine the stacking order of two or more roads that are vertically aligned with one another. In this regard, the method, apparatus and computer program product of an example embodiment are configured to determine the stacking order of the roads based upon error statistics associated with probe points representative of travel along the roads. For example, in an instance in which the roads define an intersection, the method, apparatus and computer program product of an example embodiment may determine which road is the overpass and which road is the underpass. By determining the stacking order of two or more roads, a map representative of the roads may be created or refined to illustrate not only the respective locations of the roads, but also the stacking order of the roads at the locations at which the roads are vertically aligned with one another.

The apparatus of an example embodiment may be embodied by a variety of computing devices including, for example, such as a navigation system, an advanced driver assistance system (ADAS), a GPS system or the like. Additionally or alternatively, the apparatus may be embodied in other types of computing devices, such as a server, a personal computer, a computer workstation, a laptop computer, a plurality of networked computing devices or the like, that are configured to analyze probe points, such as for the creation or refinement of a map. In this regard, FIG. 1 depicts the apparatus 10 of an example embodiment that may be embodied by various computing devices including those identified above. As shown, the apparatus of an example embodiment may include, may be associated with or may otherwise be in communication with a processor 12 and a memory device 14 and optionally a communication interface 16 and/or a user interface 18.

In some embodiments, the processor 12 (and/or co-processors or any other processing circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 10 may be embodied by a computing device including those described above. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment also optionally includes a communication interface 16 that may be any means such as a device or circuitry embodied in either hardware or a combination of hardware and software that is configured to receive and/or transmit data from/to other electronic devices in communication with the apparatus, such as by being configured to receive probe data from a database, cloud storage or other external memory device and/or to provide a representation of the road geometry to an in-vehicle global positioning system (GPS), in-vehicle navigation system, a personal navigation device (PND), a portable navigation device or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 1, the apparatus 10 may also optionally include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 14 and/or the like).

In order to determine the stacking sequence of a plurality of vertically aligned roads, such as in conjunction with an intersection that includes an overpass and an underpass or other road configurations in which the roads are stacked, reference is now made to FIG. 2 in which the operations performed, such as by the apparatus 10 of FIG. 1, are depicted. In this regard, the apparatus of an example embodiment includes means, such as the processor 12, the memory 14, the communication interface 16 or the like, for determining error statistics associated with probe points representative of travel along a first road. The probe points may be collected by a variety of different data collection devices, such as GPS systems, navigation systems or other location tracking systems. These data collection devices may be carried by vehicles, for example, as the vehicles travel along the roads. For example, the data collection devices may be mounted within the vehicles, such as a component of a navigation system, an ADAS or the like, or may be carried by the passengers within the vehicle, such as in an instance in which the data collection device is embodied by a mobile terminal, tablet computer or other portable computing device carried by the passenger riding within the vehicle. The data collection devices repeatedly capture probe points as the data collection devices move along a respective road, such as by capturing probe points at a predefined frequency.

Each probe point defines the location at which the probe point was captured, such as in terms of latitude and longitude. In addition, each probe point includes the attitude or another measurement of the height or elevation of the data collection device at the time at which the probe point was captured (hereinafter generally referenced as "altitude"). The probe point may also include or otherwise be associated with a variety of other information including, for example, the heading of the vehicle at the time at which the probe point was captured. The probe points may be stored locally, such as by the memory device 14, or remotely, such as by cloud storage, a remote server, a remote database or the like, in such a manner as to be accessible by the processor 12, such as via the communication interface 16.

The location information associated with a probe point has an error associated therewith. The error associated with the altitude is relatively large, such as in comparison to the latitude and longitude, such that it is difficult to predict with any meaningful degree of confidence as to which of a pair of roads that are vertically aligned, such as in terms of a pair of stacked roads or a pair of roads that define an overpass and an underpass, passes over or under the other road. Additionally, while the errors associated with the latitude and longitude of the location at which the probe point was captured are generally much smaller than the error associated with the altitude, the errors associated with the latitude and longitude of a probe point increase appreciably when the vehicle that is carrying the data collection device passes beneath another road, such as by passing beneath overpass or traveling along a lower of two or more stacked roads, such as the San Francisco Bay Bridge.

In this regard, the position of a data collection device is generally defined based upon satellite communication between the data collection device and a plurality of satellites, e.g., GPS satellites. In an instance in which the vehicle in which a GPS data collection device travels along an underpass or along the lower of a plurality of stacked roads, the satellite communication with the data collection device may be interrupted or may otherwise deteriorate, particularly in comparison to the satellite communications with the data correction devices carried by vehicles on the upper road, such as the overpass or the upper road of a plurality of stacked roads. As a result of the obscuration of the view of the GPS satellites by the data collection device traveling along the lower of a plurality of stacked roads, the GPS accuracy is negatively affected as evidenced by increased error, such as may be defined by the dilution of precision (DOP). In this regard, DOP provides a real-time estimate of the accuracy of GPS signals. The DOP characterizes the user-satellite geometry and is related to the volume formed by the intersection points of the user-satellite vectors with the unit sphere centered on the user. Larger volumes result in smaller DOPs. A lower DOP value generally represents better positional accuracy. However, a lower DOP value does not automatically mean a lower positional error. Instead, the quality of a GPS-derived position estimate depends upon both the measurement geometry as represented by the DOP values and range errors caused by signal strength, ionospheric effects, multipath effects, etc.

As a result and further since DOP data for data collection devices that obtain probe points is not generally available, the errors associated with probe points captured by a data collection device may be expressed in other manners. For example, the error may be expressed as a distance root mean squared (DRMS), which expresses two-dimensional accuracy. In order to determine the DRMS of horizontal position errors, the standard errors from a known position in the directions of the coordinate axes are required. DRMS is the square root of the average of the square errors. Alternatively, the positional error may be expressed as a circular error probability (CEP). CEP refers to the radius of a circle in which at least 50% of the values, e.g., probe points, occur. For example, a CEP of 5 meters means that 50% of horizontal point positions are within 5 meters of the true position. A radius of 95% is often utilized, such as identified by R95, which represents a CEP in which the radius of a circle is defined so as to capture 95% of the values lie therewithin. Regardless of the manner in which the error associated with the position of a probe point is defined, the error associated with the position of a probe point increases in an instance in which the communication between the satellites and the data collection device is obscured, such as when passing along an underpass or while driving along the lower road of a plurality of stacked roads.

As shown in block 20 of FIG. 2, the apparatus 10 includes means, such as the processor 12 or the like, for identifying locations at which a first road is vertically aligned with another road, hereinafter designated as a second road. The first road may be vertically aligned with the second road in an instance in which the first and second roads intersect or is otherwise co-located, at least in latitude and longitude. These intersections may include intersections between first and second roads that are at grade, that is, an intersection at which the first and second roads are at the same altitude, such as a traditional four-way stop. Other types of intersections include intersections in which an overpass passes over the top of an underpass. The roads may be co-located, at least in latitude and longitude, in some instances in which the roads do not intersect, such as in instances in which the first and second roads are stacked one on top of the other for some distance, such as exemplified by the San Francisco Bay Bridge. In an instance in which the roads define an intersection having an overpass passing over an underpass or in which the roads are stacked with one road beneath the other road, the first and second roads are considered to be vertically aligned. The apparatus, such as the processor, may identify roads that are vertically aligned in various manners including by review of a map to identify roads that intersect one another or that appear to overlie one another.

In an instance in which the first road is identified to be vertically aligned with a second road, the apparatus 10 includes means, such as the processor 12 or the like, for determining error statistics associated with travel along the first road, as well as means, such as the processor or the like, for determining whether one of the first or second roads passes beneath the other of the first or second roads based at least in part upon the error statistics. See blocks 22 and 24 of FIG. 2. As described below, various error statistics may be utilized in this determination, but the apparatus, such as the processor, of an example embodiment is configured to rely upon root means square errors associated with the probe points representative of the travel along the first road in order to determine whether one of the roads passes beneath the other of the roads. In this regard, the apparatus, such as the processor, may be configured to evaluate the error statistics associated with probe points representative of travel along the first road in various manners in order to determine which, if either, of the first or second road to passes beneath the other of the first or second roads.

In an example embodiment, a map including a plurality of road segments that form the first and second roads 30, 32 may be defined as shown in FIG. 3. The road segments may be represented by various road center representations including polylines or analytical curves, such as B-splines, Bezier curves, clothoid curves or the like. For the purposes of example and not of limitation, the road center representations will be hereinafter generally described as polylines. In this regard, polylines 34 may be defined as shown in FIG. 3 in order to represent the road segments of the first and second roads 30, 32. In this regard, the polylines may define an entire road segment as shown in FIG. 3 or polylines may be defined for each direction of travel along the road segment. The polylines may be preexisting in that the polylines may have been previously defined and stored, such as a memory 14 or in a remote storage device accessible to the processor 12 such as via the communication interface 16. Alternatively, the polylines representative of the road segments of the first and second roads may be estimated based upon the probe points representative of travel along the first and second roads. In this regard, the polylines may be defined in various manners including utilization of the techniques described by U.S. patent application Ser. No. 14/729,681 entitled Method and Apparatus for Defining Road Geometry from Probe Data filed on Jun. 3, 2015 and U.S. patent application Ser. No. 14/729,773 entitled Method and Apparatus for Defining Bi-Directional Road Geometry from Probe Data filed on Jun. 3, 2015, the contents of both of which are incorporated herein by reference their entirety. As shown in FIG. 3, the first road passes under the overpass 36 formed by the second road.

Regardless of the manner in which the polyline 34 is defined, or in which the road segments of the first and second roads 30, 32 are represented, the apparatus 10 of this example embodiment includes means, such as the processor 12 or the like, for determining the error statistics by determining error statistics associated with a projection of a probe points onto a representation a road segment of the first road. By way of example, probe points may be projected onto the representation of the first road by determining the perpendicular distance from each probe point to the representation of the road segment, such as to the polyline representative of the road segment. In this regard, FIG. 4 depicts the projections 42 of a plurality of probe points 40 onto the polyline. In the example of FIG. 4, the projection distances from the respective probe points to the polyline are indicated by the length of the perpendicular line segments extending outwardly from the polyline to the respective probe points.

In this example embodiment, the apparatus 10 includes means, such as the processor 12 or the like, for determining whether one of the first or second roads passes beneath the other or the first or second roads by determining that the first road passes beneath the second road in an instance in which the error statistics associated with the probe points representative of travel along the first road increase proximate the second road. In this regard, the region in which the error statistics are evaluated and in which the first road is considered to be proximate the second road include the location at which the first road is vertically aligned with the second road as well as a predefined distance along the first road beyond the second road in the direction of travel of vehicles along the first road, such as 50 or 100 meters beyond the second road in the direction of travel along the first road.

The error statistics associated with the projection of probe points 40 onto the representation of a road segment of the first road 30 may, in an example embodiment, be the root mean square error (RMSE) associated with the projection distances from the probe points onto the representation the road segment of the first road. Thus, the apparatus 10, such as the processor 12, of this example embodiment may identify the first road 30 to pass beneath the second road 32 in an instance in which the root mean square error associated with the probe points representative of travel along the first road proximate the second road increase relative to the root mean square error associated with probe points representative of travel along the first road at other locations along the first road that are not proximate to the second road. In an example embodiment, the apparatus, such as the processor, requires the increase in the error statistics, such as the RMSE, to satisfy, such as by exceeding, a predefined threshold, prior to identifying the first road to pass beneath the second road.

Although the determination of the stacking sequence of two or more roads in an instance in which the roads are vertically aligned may be based upon an analysis of individual probe points 40, such as described above in conjunction with FIGS. 3 and 4 and in other instances in which the probe points are collected by the data collection devices at a relatively low frequency, such as at a frequency of less than 0.1 hertz, the apparatus 10, such as the processor 12, of another example embodiment may rely upon probe traces defined based upon probe points collected at a higher frequency, such as at 10 hertz or greater, in order to determine whether a first road 30 passes beneath the second road 32 in an instance in which the roads are vertically aligned. In this example embodiment, the probe points representative of travel along the first road define a probe trace as shown in FIG. 5, such as in an instance in which the probe points are collected with a relatively high frequency, such as at least 10 hertz. In this regard, a plurality of probe traces 38 collected by vehicles carrying data collection devices along a plurality of roads are shown in FIG. 5.

In order to determine whether one of the first or second roads passes beneath the other of the first or second roads, the apparatus 20 of an example embodiment includes means, such as the processor 12 or the like, for determining that the first road 30 passes beneath the second road 32 in an instance in which the error statistics associated with the probe traces representative of travel along the first road increase proximate the second road. Although the error statistics associated with a probe trace may be defined in various manners, the apparatus, such as the processor, of an example embodiment may determine the error statistics associated with a probe trace by determining the root mean square error between a pair of probe traces. Indeed, the apparatus, such as the processor, may determine the root mean square error between a plurality of different pairs of probe traces and may, in turn, determine the average or median root mean square error at various locations along the first road. The apparatus of this example embodiment also includes means, such as the processor or the like, for determining that the first road passes beneath the second road in an instance in which the spread of root means square errors increases proximate the second road, such as at the location in which the first and second roads are vertically aligned or within a predefined distance along the first road beyond the second road in the direction of travel along the first road. In an example embodiment, the apparatus, such as the processor, determines that the first road passes beneath the second road only in an instance in which the spread of root mean square errors between a pair of probe traces or an average spread of root mean square errors between a plurality of different pairs of probe traces increases by at least a predefined amount proximate the second road.

In another example embodiment, the apparatus 10, such as the processor 12, is configured to determine error statistics and, in turn, the stacking sequence of a plurality of roads that are vertically aligned based upon an evaluation of individual probe points 40. As shown in FIG. 6, for example, the apparatus of this example embodiment includes means, such as the processor or the like, for determining, for a respective probe point, a median heading direction of probe points proximate the respective probe point. See block 50 of FIG. 6. As shown in FIG. 7 by way of example, probe points 62 within a predefined distance, such as a predefined radius 64, of a respective probe point 60 may be identified and the median heading direction (arrow 68) of those probe points may be determined. The apparatus of this example embodiment also includes means, such as the processor or the like, for defining a local orientation line from the respective probe point and extending in both directions of the median heading direction. See block 52. As shown in FIG. 7, for example, the dashed local orientation line 66 begins at the respective probe point and extends in both directions of the median heading direction. The apparatus of this example embodiment also includes means, such as the processor or the like, for determining, for the respective probe point, the error statistics associated with projection distances of the probe points (that is, the probe points 62 within a predefined distance of the respective probe point 60) onto the local orientation line. See block 54.

As described above, various types of error statistics may be determined including, for example, the root mean square error associated with the projection distances of the probe points proximate the respective probe point onto the local orientation line. As described above in conjunction with FIG. 4, the projection distances include the perpendicular distances between the probe points 62 that were previously identified to be proximate to the respective probe point 60 to the local orientation line 66 that extends in the medium heading direction from the respective probe point. In this example embodiment, the apparatus 10 includes means, such as the processor 12 or the like, for determining whether one or the first or second roads passes beneath the other of the first or second records by determining that the first road passes beneath the second road in an instance in which the error statistics, such as the root mean square errors, increase for the respective probe point proximate the second road. See block 56 of FIG. 6. For example, the apparatus, such as the processor, of this example embodiment is configured to identify the first road to pass beneath the second road in an instance in which the root mean square error associated with the respective probe point proximate the second road exceeds the root mean square error, such as the average root mean square error, of the probe points at other locations along the first road which are not proximate the second road and are not vertically aligned with another road by at least a predefined amount.

By way of another example and as depicted in FIG. 8, the apparatus 10 of an example embodiment determines the error statistics by including means, such as the processor 12 or the like, for determining, for a respective probe point, the median heading direction of probe points proximate the respective probe point, such as described above in conjunction with block 50 of FIG. 6. See block 70 of FIG. 8. The apparatus of this example embodiment also includes means, such as the processor or the like, for determining, for the respective probe point, the heading error statistics, such as the root mean square errors, associated with the probe points proximate the respective probe point relative to the median heading direction. See block 72. In this regard, the error statistics, such as the root mean square error, between the heading direction associated with those probe points that were previously identified to be proximate to the respective probe point and the median heading direction may be identified, thereby providing a measure of the spread of the heading directions of those probe points. In this example embodiment, the apparatus includes means, such as the processor of the like, for determining whether one of the first or second roads passes beneath the other first or second roads by determining that the first road passes beneath the second road in an instance in which the error statistics, such as the root mean square error, increase for the respective probe point proximate the second road. See block 74. For example, the apparatus, such as the processor, of this example embodiment is configured to identify the first road to pass beneath the second road in an instance in which the root mean square error associated with the respective probe point proximate the second road exceeds the root mean square error, such as the average root mean square error, of the probe points at other locations along the first road which are not proximate the second road and are not vertically aligned with another road by at least a predefined amount.

In some example embodiments, the width of the road may be taken into consideration in the determination of the error statistics since a wider road will yield a wider footprint in terms of the locations associated with probe points traveling along the road relative to a narrower road even though the more widely dispersed probe points captured along the wider road may have no more error than the more tightly located probe points captured along a narrower road. Thus, the error statistics may be normalized relative to the road width, such as expressed in terms of the distance across the road, the number of lanes supported by the road or the like.

As such, the apparatus 10 of this example embodiment includes means, such as the processor 12 or the like, for determining error statistics by normalizing the error statistics based upon the width of the first road.

Additionally, while the foregoing description relating to the determination of error statistics was in terms a road represented by a single polyline or by multiple polylines, one of which extends in each direction of travel along the road, the road may be further segmented so that each lane of the road is separately represented, such as by as lane center representation or the like. In this example embodiment, the probe points may then be separated, not just based upon the road along which the probe points were captured or the direction of travel along the road at which the probe points were captured, but based upon the lane of the road and the direction of travel along which the probe points were captured. In this example embodiment, error statistics may be separately determined for the probe points associated with each lane of travel along the road.

As described above, a method, apparatus 10 and computer program product are provided to determine the stacking order of two or more roads that are vertically aligned with one another. In this regard, the method, apparatus and computer program product of an example embodiment are configured to determine the stacking order of the roads based upon error statistics associated with probe points representative of travel along the roads. By determining the stacking order of two or more roads, a map representative of the roads may be created or refined to illustrate not only the respective locations of the roads, but also the stacking order of the roads at the locations at which the roads are vertically aligned with one another.

FIGS. 2, 6 and 8 illustrate flowcharts of an apparatus, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by a processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method implemented by a navigation system, the method comprising:
   determining error statistics associated with probe points representative of travel along a first road by a plurality of vehicles and provided by data collection devices carried by the vehicles during travel along the first road, wherein determining error statistics comprises at least one of: (i) determining error statistics associated with projection distances defined as a perpendicular distance from the probe points provided by the data collection devices carried by the plurality of vehicles during travel along the first road to a representation of a road segment of the first road, (ii) determining error statistics associated with differences in location between a plurality of probe traces representative of travel by the plurality of vehicles along the first road and defined by the probe points provided by the data collection devices carried by the plurality of vehicles including a difference in location between a first probe trace representative of travel by a first vehicle along the first road and defined by probe points provided by the data collection device carried by the first vehicle and a second probe trace representative of travel by a second vehicle along the first road and defined by probe points provided by the data collection device carried by the second vehicle, or (iii) determining error statistics associated with differences in heading directions of the probe points provided by the data collection devices carried by the plurality of vehicles relative to a median heading direction;

in an instance in which the first road is vertically aligned with a second road, determining whether one of the first or second roads passes beneath the other of the first or second roads and, in an instance in which one of the first or second roads is determined to pass beneath the other of the first or second roads, determining which one of the first or second roads passes beneath the other of the first or second roads based at least in part upon the error statistics associated with the probe points representative of travel along the first road; and creating or refining a map representative of the first and second roads to illustrate a stacking order of the first and second roads based on the one of the first or second roads that is determined to pass beneath the other of the first or second roads.

2. A method according to claim 1 wherein the probe points representative of travel along the first road define a probe trace, and wherein determining whether one of the first or second roads passes beneath the other of the first or second roads comprises determining that the first road passes beneath the second road in an instance in which the error statistics associated with the probe trace representative of travel along the first road increase proximate the second road.

3. A method according to claim 2 wherein determining error statistics comprises determining a root mean square error between probe traces, and wherein determining that the first road passes beneath the second road comprises determining that the first road passes beneath the second road in an instance in which a spread of root mean square errors increases proximate the second road.

4. A method according to claim 1 wherein determining whether one of the first or second roads passes beneath the other of the first or second roads comprises determining that the first road passes beneath the second road in an instance in which the error statistics associated with the projection distances of the probe points representative of travel along the first road increase proximate the second road.

5. A method according to claim 4 wherein determining error statistics associated with the projection distances of the probe points onto the representation of the road segment of the first road comprises determining a root mean square error associated with projection distances of the probe points onto the representation of the road segment of the first road.

6. A method according to claim 4 further comprising estimating a road centerline representation representative of the road segment of the first road based upon the probe points representative of travel along the first road.

7. A method according to claim 1 wherein determining error statistics comprises:
determining, for a respective probe point, the median heading direction of probe points proximate the respective probe point; and
defining a local orientation line from the respective probe point and extending in both directions of the median heading direction, wherein the local orientation line defines the representation of the road segment of the first road, and
wherein determining whether one of the first or second roads passes beneath the other of the first or second roads comprises determining that the first road passes beneath the second road in an instance in which the error statistics increase for the respective probe point proximate the second road.

8. A method according to claim 1 wherein determining error statistics comprises:

determining, for a respective probe point, the median heading direction of probe points proximate the respective probe point; and
determining, for the respective probe point, heading error statistics associated with probe points proximate the respective probe point relative to the median heading direction, and
wherein determining whether one of the first or second roads passes beneath the other of the first or second roads comprises determining that the first road passes beneath the second road in an instance in which the error statistics increase for the respective probe point proximate the second road.

9. A method according to claim 1 wherein determining error statistics comprises normalizing the error statistics based upon a width of the first road.

10. A navigation system comprising at least one processor and at least one memory including computer program code, the at least one memory and computer program code configured to, with the processor, cause the apparatus to at least:
determine error statistics associated with probe points representative of travel along a first road by a plurality of vehicles and provided by data collection devices carried by the vehicles during travel along the first road, wherein the error statistics that are determined comprise at least one of: (i) error statistics associated with projection distances defined as a perpendicular distance from the probe points provided by the data collection devices carried by the plurality of vehicles during travel along the first road to a representation of a road segment of the first road, (ii) error statistics associated with differences in location between a plurality of probe traces representative of travel by the plurality of vehicles along the first road and defined by the probe points provided by the data collection devices carried by the plurality of vehicles including a difference in location between a first probe trace representative of travel by a first vehicle along the first road and defined by probe points provided by the data collection device carried by the first vehicle and a second probe trace representative of travel by a second vehicle along the first road and defined by probe points provided by the data collection device carried by the second vehicle, or (iii) error statistics associated with differences in heading directions of the probe points provided by the data collection devices carried by the plurality of vehicles relative to a median heading direction;
in an instance in which the first road is vertically aligned with a second road, determine whether one of the first or second roads passes beneath the other of the first or second roads and, in an instance in which one of the first or second roads is determined to pass beneath the other of the first or second roads, determine which one of the first or second roads passes beneath the other of the first or second roads based at least in part upon the error statistics associated with the probe points representative of travel along the first road; and
create or refine a map representative of the first and second roads to illustrate a stacking order of the first and second roads based on the one of the first or second roads that is determined to pass beneath the other of the first or second roads.

11. A navigation system according to claim 10 wherein the probe points representative of travel along the first road define a probe trace, and wherein the at least one memory and the computer program code are configured to, with the processor, cause the apparatus to determine whether one of the first or second roads passes beneath the other of the first or second roads by determining that the first road passes beneath the second road in an instance in which the error statistics associated with the probe trace representative of travel along the first road increase proximate the second road.

12. A navigation system according to claim 11 wherein the at least one memory and the computer program code are configured to, with the processor, cause the apparatus to determine error statistics by determining a root mean square error between probe traces, and wherein the at least one memory and the computer program code are configured to, with the processor, cause the apparatus to determine that the first road passes beneath the second road by determining that the first road passes beneath the second road in an instance in which a spread of root mean square errors increases proximate the second road.

13. A navigation system according to claim 10 wherein the at least one memory and the computer program code are configured to, with the processor, cause the apparatus to determine whether one of the first or second roads passes beneath the other of the first or second roads by determining that the first road passes beneath the second road in an instance in which the error statistics associated with the projection distances of the probe points representative of travel along the first road increase proximate the second road.

14. A navigation system according to claim 13 wherein the at least one memory and the computer program code are configured to, with the processor, cause the apparatus to determine error statistics associated with the projection distances of the probe points onto the representation of the road segment of the first road by determining a root mean square error associated with projection distances of the probe points onto the representation of the road segment of the first road.

15. A navigation system according to claim 13 wherein the at least one memory and the computer program code are further configured to, with the processor, cause the apparatus to estimate a road centerline representation representative of the road segment of the first road by estimating the road centerline representation based upon the probe points representative of travel along the first road.

16. A navigation system according to claim 10 wherein the at least one memory and the computer program code are configured to, with the processor, cause the apparatus to determine error statistics by:
  determining, for a respective probe point, the median heading direction of probe points proximate the respective probe point; and
  defining a local orientation line from the respective probe point and extending in both directions of the median heading direction, wherein the local orientation line defines the representation of the road segment of the first road, and
  wherein the at least one memory and the computer program code are configured to, with the processor, cause the apparatus to determine whether one of the first or second roads passes beneath the other of the first or second roads by determining that the first road passes beneath the second road in an instance in which the error statistics increase for the respective probe point proximate the second road.

17. A non-transitory computer-readable storage medium of a navigation system having computer-executable program code portions stored therein, the computer-executable program code portions comprising program code instructions configured to:
  determine error statistics associated with probe points representative of travel along a first road by a plurality of vehicles and provided by data collection devices carried by the vehicles during travel along the first road, wherein determining error statistics comprises at least one of: (i) determining error statistics associated with projection distances defined as a perpendicular distance from the probe points provided by the data collection devices carried by the plurality of vehicles during travel along the first road to a representation of a road segment of the first road, (ii) determining error statistics associated with differences in location between a plurality of probe traces representative of travel by the plurality of vehicles along the first road and defined by the probe points provided by the data collection devices carried by the plurality of vehicles including a difference in location between a first probe trace representative of travel by a first vehicle along the first road and defined by probe points provided by the data collection device carried by the first vehicle and a second probe trace representative of travel by a second vehicle along the first road and defined by probe points provided by the data collection device carried by the second vehicle, or (iii) determining error statistics associated with differences in heading directions of the probe points provided by the data collection devices carried by the plurality of vehicles relative to a median heading direction;
  in an instance in which the first road is vertically aligned with a second road, determine whether one of the first or second roads passes beneath the other of the first or second roads and, in an instance in which one of the first or second roads is determined to pass beneath the other of the first or second roads, determine which one of the first or second roads passes beneath the other of the first or second roads based at least in part upon the error statistics associated with the probe points representative of travel along the first road; and
  create or refine a map representative of the first and second roads to illustrate a stacking order of the first and second roads based on the one of the first or second roads that is determined to pass beneath the other of the first or second roads.

18. A non-transitory computer-readable storage medium according to claim 17 wherein the probe points representative of travel along the first road define a probe trace, and wherein the program code instructions configured to determine whether one of the first or second roads passes beneath the other of the first or second roads comprise program code instructions configured to determine that the first road passes beneath the second road in an instance in which the error statistics associated with the probe trace representative of travel along the first road increase proximate the second road.

19. A non-transitory computer-readable storage medium according to claim 17 wherein the program code instructions configured to determine whether one of the first or second roads passes beneath the other of the first or second roads comprise program code instructions configured to determine that the first road passes beneath the second road in an instance in which the error statistics associated with the projection distances of the probe points representative of travel along the first road increase proximate the second road.

20. A non-transitory computer-readable storage medium according to claim 17 wherein the program code instructions configured to determine error statistics comprise program code instructions configured to:
  determine, for a respective probe point, the median heading direction of probe points proximate the respective probe point; and
  define a local orientation line from the respective probe point and extending in both directions of the median heading direction, wherein the local orientation line defines the representation of the road segment of the first road, and
  wherein the program code instructions configured to determine whether one of the first or second roads passes beneath the other of the first or second roads comprise program code instructions configured to determine that the first road passes beneath the second road in an instance in which the error statistics increase for a respective probe point proximate the second road.

21. A method according to claim 1 wherein the probe points, from which error statistics associated with projection distances are determined, are collected at a frequency of less than 0.1 Hertz.

22. A navigation system according to claim 10 wherein the probe points, from which error statistics associated with projection distances are determined, are collected at a frequency of less than 0.1 Hertz.

23. A non-transitory computer-readable storage medium according to claim 17 wherein the probe points, from which error statistics associated with projection distances are determined, are collected at a frequency of less than 0.1 Hertz.

24. A method according to claim 1 wherein the probe points that define the probe traces, from which error statistics associated with differences in location therebetween are determined, are collected at a frequency of at least 10 Hertz.

25. A navigation system according to claim 10 wherein the probe points that define the probe traces, from which error statistics associated with differences in location therebetween are determined, are collected at a frequency of at least 10 Hertz.

26. A non-transitory computer-readable storage medium according to claim 17 wherein the probe points that define the probe traces, from which error statistics associated with differences in location therebetween are determined, are collected at a frequency of at least 10 Hertz.

* * * * *